United States Patent [19]

Abel

[11] Patent Number: 4,486,662
[45] Date of Patent: Dec. 4, 1984

[54] SWITCH-WHILE-SCAN OPTICAL SYSTEM

[75] Inventor: Irving R. Abel, Lexington, Mass.

[73] Assignee: Honeywell Inc., Minneapolis, Minn.

[21] Appl. No.: 453,646

[22] Filed: Dec. 27, 1982

[51] Int. Cl.³ .............................................. H01J 31/49
[52] U.S. Cl. ..................................... 250/334; 250/342
[58] Field of Search ............... 250/330, 334, 342, 347; 358/113, 206; 350/301

[56] References Cited

U.S. PATENT DOCUMENTS 3,728,545  4/1973  Abel ...................................... 250/334
3,867,633  2/1975  Patrick et al. ......................... 250/347
4,084,092  4/1978  Runciman ............................. 250/347

Primary Examiner—Janice A. Howell
Attorney, Agent, or Firm—John S. Solakian; Laurence J. Marhoefer

[57] ABSTRACT

An optical system produces sensor data from at least two fields of view (which may be centered differently) in a sequence selected to satisfy two simultaneous functions of the sensor.

10 Claims, 4 Drawing Figures

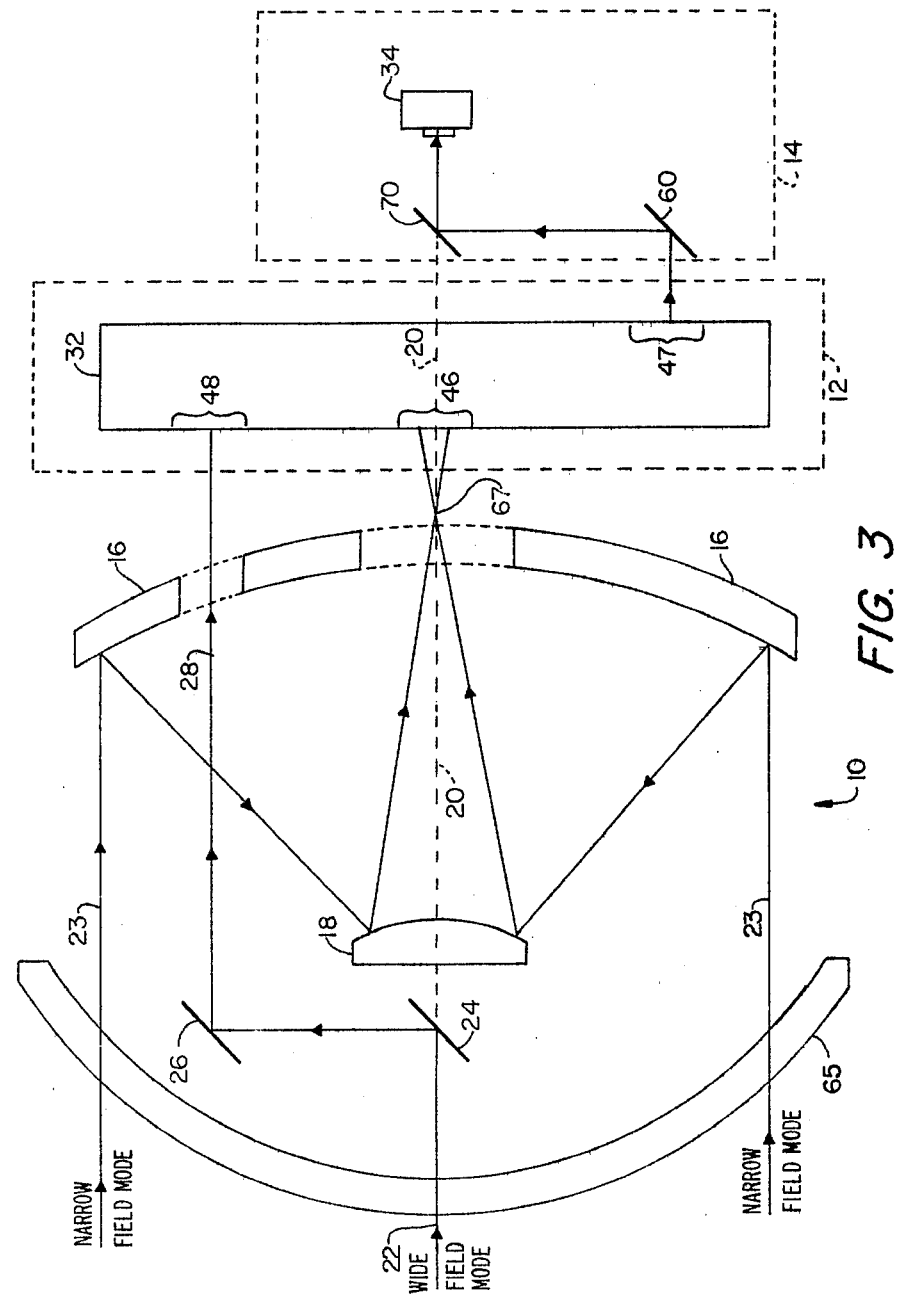

SWITCH-WHILE-SCAN OPTICAL SYSTEM

BACKGROUND OF THE INVENTION

The present invention relates to optical scanning systems which provide rapid switching between two viewing modes (for example, between narrow and wide fields of view), and, more particularly, to those scanning systems used in conjunction with Forward Looking Infrared ("FLIR") imaging devices.

The requirement for high performance, low altitude, single piloted aircraft missions has imposed severe demands upon the design of systems for the acquisition and utilization of imagery, particularly infrared or reconnaissance imagery. Typically, such low altitude aircraft sensors must simultaneously provide video information from two different fields of view; a wide field of view for general pilotage and navigation, and a narrow field of view for target screening and tracking. Although it would be possible to perform both viewing functions by providing two separate sensors, this would require a heavier, larger and much more expensive system. As a result, these constraints on sensor size, volume and detector complexity have resulted in a need for single optical imaging systems which can perform these multiple functions.

In such single optical imaging systems, since neither viewing function requires continuous update, it is possible to time share a common detector array between viewing modes, thereby reducing system complexity and cost. However, to time-share the detectors by means of directing video frames covered by the detectors from one function to the other in a selected sequence, it is necessary to switch the optical axis from one field of view to the other during a small fraction of a frame period. At the same time, it is necessary to scan so that a restricted number of detectors in an ordered array can cover the full field of view in a frame period.

In the past, a single sensor providing both scanning and switching functions has required a separate assembly for each function. For example, in some systems the scanning function has been performed by oscillating a plane mirror, or rotating an external multifaceted mirror or refractive wedges. The function of switching between different optical systems or fields of view has been provided by either a second oscillating plane mirror, a light modulator or a mechanical shutter.

Systems incorporating these types of switch and scan assemblies have numerous disadvantages. First, the use of an oscillating mirror for switching fields of view require a large drive impulse and a relatively long settling time relative to the duration of the frame period. A light modulator switch is undesirable since it requires increased aperture and/or component size. The use of oscillating mirrors or rotating refractive wedges for scanning is generally undesirable since they are limited in field angle, and are nonlinear at wider fields of view. An externally faceted drum type scanning mirror generally requires increased system volume, and is, therefore, less desirable for many applications.

It is, accordingly, a primary object of the present invention to provide an improved imaging sensor having a single scanning and field switching assembly. It is a further object of the present invention to provide a sensor which is both compact and inexpensive, and which, by virtue of its scan mechanism and shared detector electronics, provides periodic frame update for two or more fields of view. A further object of the present invention is to provide a sensor switch-while-scan mechanism which is lightweight, so that in combination with a low angular velocity, it has low inertial force, and therefore a high degree of overall stability.

SUMMARY OF THE INVENTION

These and other objects of the present invention are achieved by combining the switching and scanning functions into a single subassembly with a single rotating component. This single component may be a multifaceted internal drum-scan mirror. Two optical objective subsystems, for example, a wide and narrow field of view telescope, project light collected from a scene of interest onto a facet of an internal polygonal scanner. The sequence of facet angles is varied to match the sequence of frame stream sharing desired in the system. For example, if three frames of video information from the wide field of view are to be collected for every one video frame from the narrow field of view, the following construction might be used. Three sequential facets would be set at the same angle with respect to the radii of the scanning drum. These facets, as they scan would direct light collected by the wide field telescope in a defined direction (i.e., the direction of the detector optics). Then, the fourth facet, set at a distinctly different angle, would direct light collected from the narrow-angle field telescope in this same defined direction. After reflection from the facet, light collected by either telescope is projected normally out of the scanner and along the exit optical axis to the detector(s). From an external view of the scanning mirror, one sees two input axes to the sensor from the objectives and one output axis to the detector(s).

Due to the generally large number of facets used to provide proper frame utilization and to maintain adequate scan efficiency, the scan wheel rotates at a relatively low rate of speed. Furthermore, with proper optical design, the width of the facet can be relatively small. Consequently, the scanner can be made relatively light so that in combination with low angular velocity, it has low inertial force, and, hence, a high degree of overall stability. The device of the present invention has the added advantage that the space within the drum mirror is available and utilized. The drum rotates continuously and uniformly to provide switching and scanning in a reliable and nonperturbing dynamic fashion. The synchronism between the scanning and switching functions is correct and constant because it is built into the component. This provides a device with long life and trouble-free operation.

BRIEF DESCRIPTION OF THE DRAWINGS

The above and other objects of the present invention are achieved in the illustrative embodiment as described with respect to the Figures in which:

FIG. 3 shows a longitudinal cross section through a sensor utilizing the switch-while-scan mechanism of the present invention.

DESCRIPTION OF THE PREFERRED EMBODIMENT

Figure 1:
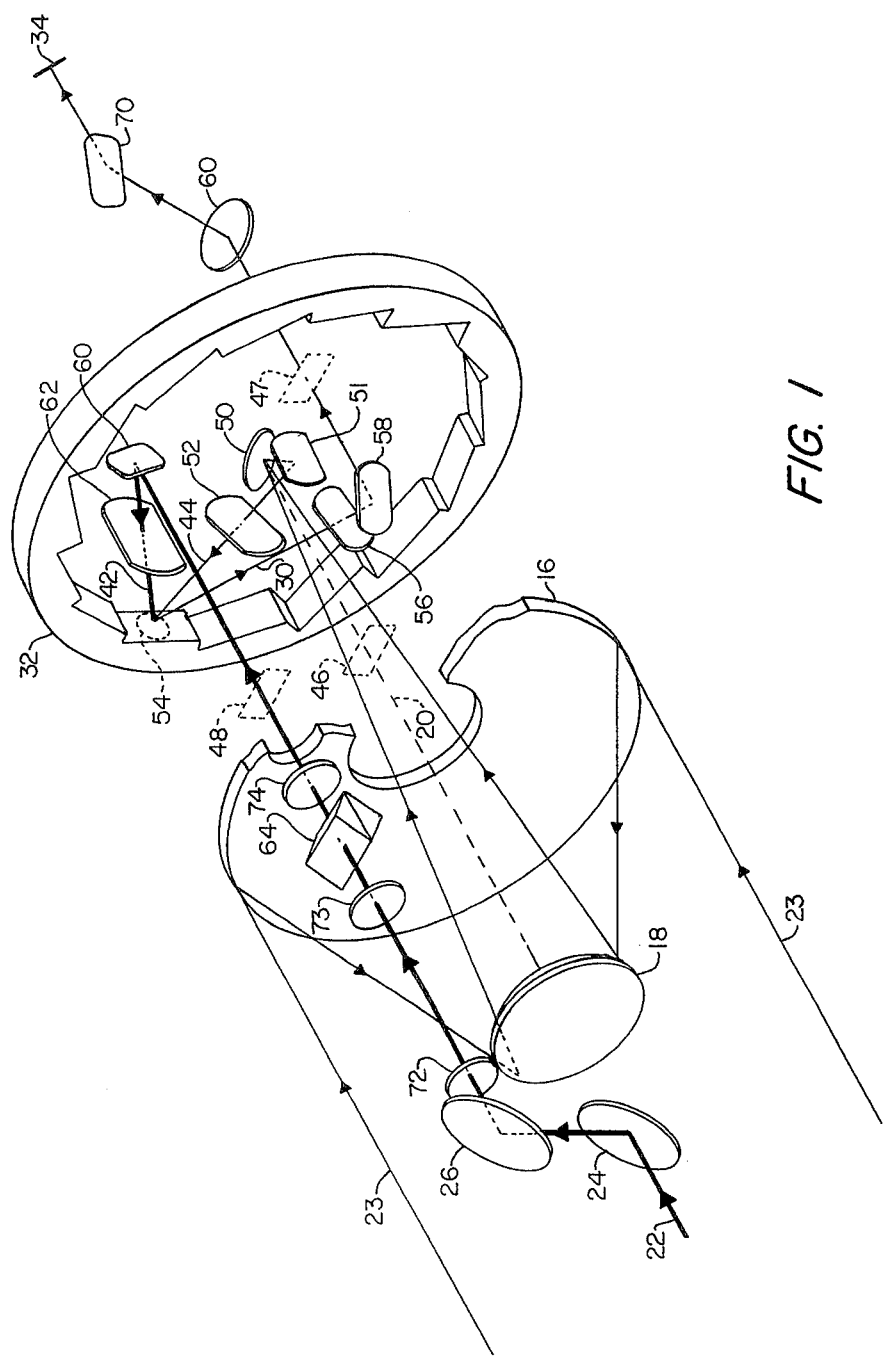
FIG. 1 shows an isometric view of the subject invention in which the optical paths of the narrow and wide field viewing modes, respectively, are shown.

FIG. 1 provides an isometric view of the system of the present invention and should be referenced with the other Figures. Referring to FIG. 3, the device of the present invention includes a telescope assembly 10, switch/scan optics 12, and an optical detector assembly 14.

In one embodiment, telescope assembly 10 might include narrow and wide field objectives located about a common optical viewing axis 20. The narrow field objective might take the form of a cassegrainian telescope comprising an annular primary mirror 16, and primary and secondary mirror 18 in order to produce a compact assembly. To incorporate a second, wide-field objective while maintaining line of sight compatibility between the two viewing modes and minimizing narrow field obscuration, beam 22 from the scene of interest is directed initially along the sensor axis 20, then turned approximately ninety degrees by fold mirror 24. Such beam is then turned by a second fold mirror 26 into scanner optics 12. The beam between mirror 26 and optics 12 is substantially parallel to the sensor axis 20. Light collected by the narrow field telescopic objective enteres the switch/scan optics 12 directly along optical axis 20; and light collected by the wide field objective enters the optics 12 along a second axis 28, which is substantially parallel to the axis 20, but is displaced by a distance which may be approximately ninety percent (90%) of the radius of the optics of drum 32. As a result of the unique geometry of the facets of scan mirror 32 coupled with the rotation of drum 32 about axis 20, the axes of the two telescopes or viewing modes are made coincident such that they emerge along a common exit port axis 30 which enters the detector assembly 14. The detector optics 56 and 58, as shown in FIG. 1, may be arranged so as to minimize volume requirements within the housing of the sensor and to accommodate the motion of the gimbals, if necessary.

Figure 2A:
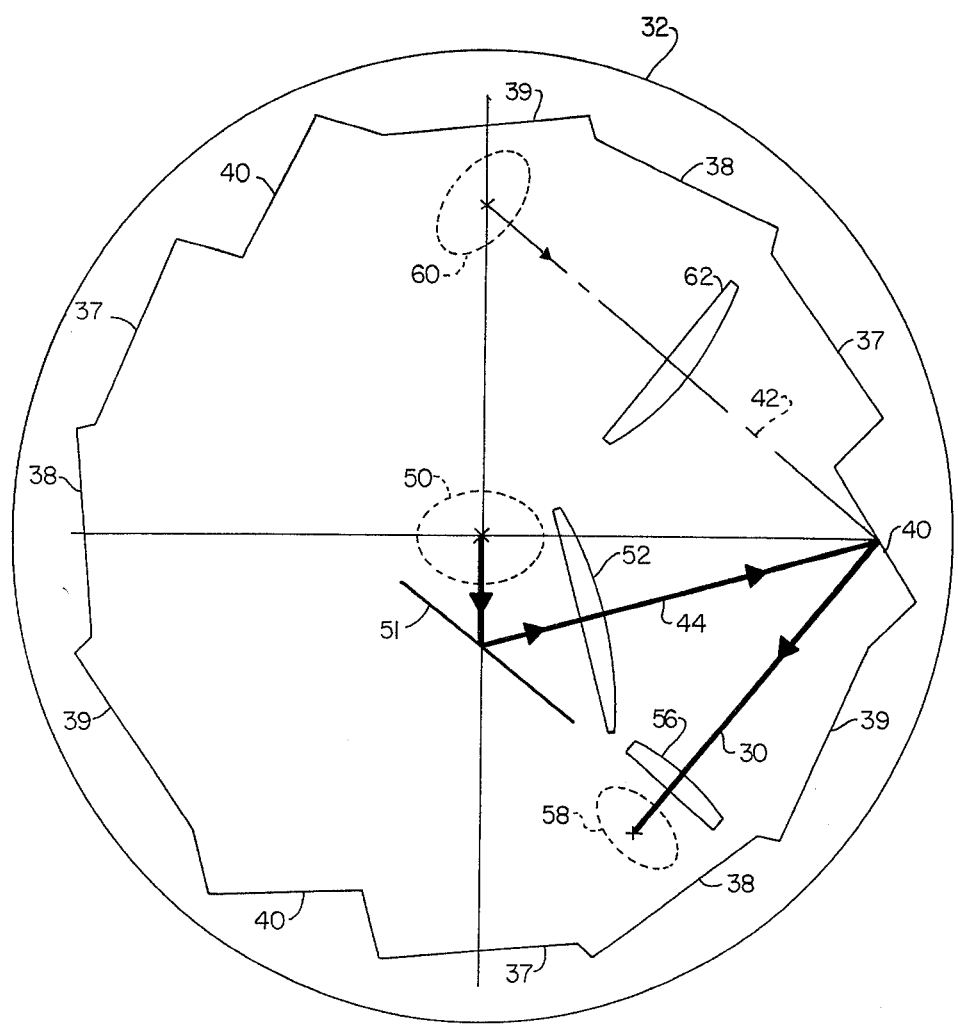
FIGS. 2A and 2B show cross sections through the internal drum scan mirror of the present invention in the narrow and wide field viewing modes, respectively.
Figure 2B:
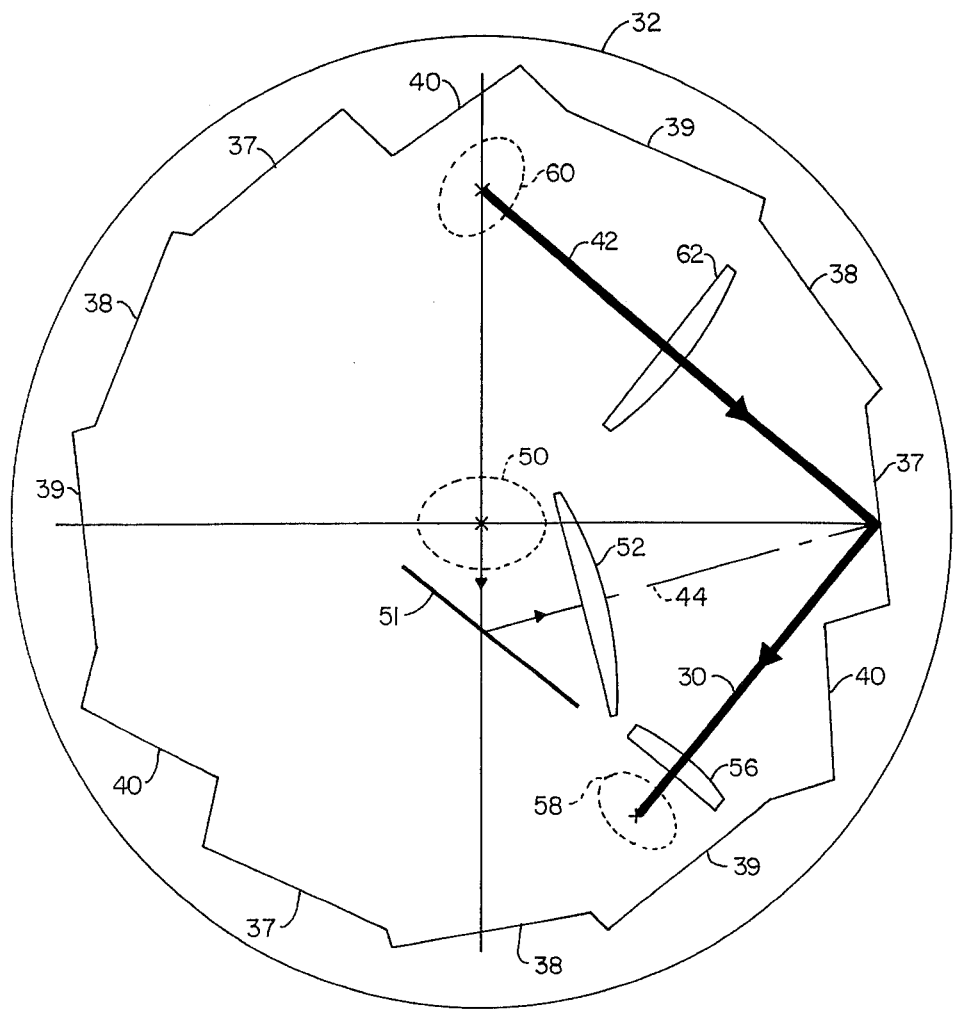

The scan function of the present invention is performed by rotation of multifaceted internal drum mirror 32 about axis 20. A scan of linear detector array 34 within detector assembly 14 is provided in order to create a two dimensional image ("frame") each time that a facet of drum 32 crosses incident radiation beams 22 or 23. Thus, with a 12-facet drum 32, as shown, by way of example, in FIGS. 2A and 2B, there are twelve frames of images produced for each rotation of the drum. The mirror facets of drum 32 are sequenced in angular tilt such that, for example, for three successive facets 37, 38 and 39, light 22 collected by the wide field optics along axis 42 will be reflected along axis 30 to the detector assembly 14; then for one facet 40, light 23 collected by the narrow field optics along axis 44 will be reflected along axis 30 to detector assembly 14. By the example shown, this sequence is then repeated two more times during one complete revolution of drum 32. While rotating uniformly, drum 32 is scanning and switching at a rate determined by the overall system requirements. For the normal television rate of 30 frames/second, the 12-sided drum must rotate at 2.5 revolutions per second (rps), which is slow enough so that perturbation to the sensor from aircraft motion is negligible.

It is understood that the frame update requirement, as well as other system parameters, will affect the size, number and sequencing of facets on the drum mirror 32. There is, however, great flexibility in the choice and sequencing of wide and narrow fields of view.

The scanner optics 12 may include all elements contained within the cylinder defined by the outer surface of the drum mirror 32. There are two entrance ports on the telescope side of the system. As shown in FIG. 3, the narrow field port 46 is located on axis 20 of drum 32; and the wide field port 48 is located at some outer radius, as shown. Light entering the narrow field port 46 is folded by two plane mirrors 50 and 51 and then collimated by a lens 52 so as to fall on a specified location on the drum 32 as designated by the optical pupil 54. The mirror facet 40 reflects the radiation to an exit lens 56 followed by a fold mirror 58, which directs the radiation out of the single exit port 47 of the drum 32. The optical pupil 54 is a point or area in space located at the mirror surface of drum 32.

Radiation entering the wide field port 48 is reflected by fold mirror 60 to a collimator lens 62. After collimation it is then reflected from the mirror facet 37, 38 or 39 in the specified direction for beam crossing. Upon reflection from the facet, the radiation propagates to the focusing exit lens 56 and then to fold mirror 58 which directs the radiation through the exit port 47.

The action of the rotating scanner drum in the example of a 12-sided drum with a 3,1,3,1,3,1 facet sequence is to reflect radiation from the outer entrance port 48 to the exit port 47 for three (3) frames, switch to radiation from the axial entrance port 46 for one (1) frame, and then repeat the sequence. Other sequences are possible. In a 12-sided (faceted) drum, the sequence could also be 5,1,5,1, or for a 10-sided drum, it could be 4,1,4,1. In addition, more than two fields of view may be viewed. For example, in a 24-sided drum, the sequence could be 2,6,4,2,6,4. It should be understood that the inwardly reflecting mirror surfaces of drum 32 may be replaced by similar outwardly reflecting mirror surfaces without departing from the spirit and scope of the present invention.

The telescope assembly 10, illustrated in FIG. 3, provides narrow and wide field coverage for target screening and pilotage or other functions, as required. Both telescopic subassemblies might be enclosed by a nearly hemispherical window 65 attached to the sensor housing, as shown. The volume enclosed by the window 65 and the housing might also include a 3-gimbal support for the optical system, detector assembly, and associated electronics which could provide stabilization and pointing relative to inertial coordinates.

To provide stabilization and pointing with respect to aircraft coordinates, the wide-field line of sight may be effectively decoupled from narrow field pointing and stabilization. This might be accomplished by supporting plane mirror 24 in a two-axis gimbal in order to nullify the effect of the overall three-axis gimbal movements.

The narrow field objective system may include a cassegrainian configuration of mirrors 16 and 18 which is made specially compact to meet spatial constraints. Its radiation output is converging toward a primary focus 67 located close to the entrance port 46 of the drum 32.

In the wide field system, the radiation is transmitted through the window 65 and then reflected vertically by the gimballed fold mirror 24. The optical axis extends vertically to the outer periphery and then folded ninety degrees by mirror 26 so as to pass through at entrance port 48.

The wide-field objective may include a stabilization and pointing mirror, a primary objective lens 72, and a relay unit made up of a fold mirror, a prism derotator 64, and transfer lenses 73 and 74. The relay unit is designed to minimize its cross-sectional area and hence its obscuration to the narrow field system.

The derotator 64, which must present in its design an odd number of reflections, could comprise a Pechan, Dove, or double Dove prism.

The detector assembly 14 might comprise any other combination of lenses and fold mirrors and a detector array necessary to collect each frame of information, while minimizing overall system size and to maximize detector efficiency.

Having described the invention, what is claimed as new and novel and for which it is desired to obtain Letters Patent is:

1. Apparatus for scanning radiant energy from a scene of interest which alternately examines at least two fields of view within said scene of interest, said apparatus comprising:
   A. scanning drum mirror means rotatable about a first axis, said drum mirror means including a plurality of reflecting mirror surfaces wherein the angles between each of said mirror surfaces and radii from said first axis to said mirror surfaces are selected to couple energy from either of said fields of view along a second axis;
   B. an optical pupil, which is an area located in space substantially at the mirror surface of said drum mirror means at a position substantially fixed relative to said first axis;
   C. first optical collection means positioned along a third axis to collect radiant energy from said first field of view and to direct said collected energy toward said pupil located at said mirror surface of said scanning drum mirror means;
   D. a second optical collection means positioned along a fourth axis to collect radiant energy from said second field of view and to direct said collected energy toward said pupil at said mirror surface of said drum mirror means; and
   E. detection means coupled to receive radiation collected by either said first or said second optical collection means which has reflected off said mirror surface located at said optical pupil in a direction substantially along said second axis.

2. Apparatus as in claim 1 in which said first optical collection means comprises a narrow field of view telescope in combination with relay and/or collimating optical elements.

3. Apparatus as in claim 2 in which said narrow field of view telescope comprises a cassegrainian type telescope, said telescope having an optical axis located substantially along said first axis.

4. Apparatus as in claim 1 in which said second optical collection means comprises a wide field of view telescope in combination with relay and/or collimating optical elements.

5. Apparatus as in claim 4 in which said second optical collection means comprises:
   A. a first folding mirror located along said first axis, said folding mirror positioned at an angle to said first axis; and
   B. a second folding mirror coupled to receive radiation reflected off said first folding mirror and to direct said radiation substantially parallel to said first axis to said drum mirror means.

6. Apparatus as in claim 1 in which:
   A. said mirror surfaces are substantially parallel to said first axis;
   B. one or more fold mirrors, positioned between said first optical collection means and said pupil such that radiant energy directed along said third axis by said first optical collection means is folded toward said pupil along a fifth axis substantially perpendicular to said first axis;
   C. one or more fold mirrors, positioned between said second optical collection means and said pupil such that radiant energy directed along said fourth axis by said second optical collection means is folded toward said pupil along a sixth axis substantially perpendicular to said first axis; and
   D. said second, fifth and sixth axes are substantially coplanar and substantially perpendicular to said first axis such that rotation of said drum mirror means creates a substantially rectilinear scan as collected by said detection means.

7. Apparatus as in claim 1 in which said drum mirror means comprises a hollow cylinder having inwardly reflecting mirror surfaces.

8. Apparatus as in claim 1 further comprising collimating optical elements positioned between said first optical collection means and said optical pupil, and between said second optical collection means and said optical pupil.

9. Apparatus as in claim 1 in which said detection means comprises a linear detector array coupled to said drum mirror means such that as said drum mirror means rotates, said linear detector array effectively sweeps across said desired scene of interest as defined by either said first or said second field of view.

10. Apparatus as in claim 9 in which said linear detector array comprises mercury cadmium telluride.

* * * * *